(12) United States Patent
Asai

(10) Patent No.: US 6,262,541 B1
(45) Date of Patent: Jul. 17, 2001

(54) ARRAY SUBSTRATE FOR FLAT-PANEL DISPLAY DEVICES

(75) Inventor: Yoshihiro Asai, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/560,884

(22) Filed: Apr. 28, 2000

(30) Foreign Application Priority Data

Apr. 30, 1999 (JP) .................................................. 11-124519

(51) Int. Cl.[7] ........................................................ G09G 3/36
(52) U.S. Cl. ........................ 315/169.4; 345/98; 345/100
(58) Field of Search ............................ 315/169.1–169.4; 345/55, 56, 76, 77, 84, 98, 100

(56) References Cited

U.S. PATENT DOCUMENTS 5,644,331 * 7/1997 Hazama ................................... 345/98
6,127,998 * 10/2000 Ichikawa et al. ...................... 345/100
6,184,849 * 2/2001 Stoller ................................. 315/169.4

FOREIGN PATENT DOCUMENTS 11-119246   4/1999 (JP) .

* cited by examiner

Primary Examiner—Don Wong
Assistant Examiner—Wilson Lee
(74) Attorney, Agent, or Firm—Pillsbury Winthrop LLP

(57) ABSTRACT

Each signal-input pad in signal-line pad groups and scanning-line pad groups has enough width and length for contacting with inspection probe and serves as an inspection pad. Hence, the space for disposing inspection pads separately from the connection pads are no more needed, thereby reducing width of periphery connection area in the array substrate.

8 Claims, 4 Drawing Sheets

SECOND EMBODIMENT

ARRAY SUBSTRATE FOR FLAT-PANEL DISPLAY DEVICES

BACKGROUND OF THE INVENTION

This invention relates to an array substrate for flat-panel display devices and, more particularly, to an array substrate having inspection pads as well as connection pads for mounting driver circuit at periphery of the substrate.

Recently, flat-panel display devices such as liquid crystal display devices have been used as image display devices for television set, various computers, car navigation system and the like because of their features that they are thin and light-weighted and consume a small electric power.

A flat-panel display device such as a liquid crystal display device is comprised of an array substrate having pixel electrodes and a pixel-driving wiring pattern thereon and a counter substrate assembled with the array substrate. A liquid crystal layer acting as a light modulating layer, for example, is held between the array and counter substrates. The array substrate generally has a pixel area for displaying an image and a peripheral connection area at outside of the pixel area, on an insulating substrate plate that comprised the flat-panel display. On the peripheral connection area, driver circuits and input wirings are disposed.

In a so-called chip-on-glass (COG) method as a way for disposing the driver circuits on the peripheral connection area, driver IC chips are directly mounted on an insulating substrate such as a glass plate using connecting means such as anisotropic conductive film (ACF). This COG method enables not only size reduction of non-displaying peripheral area of the display panel but also cost reduction for parts and assembling process of the flat-panel display devices.

Processes for manufacturing flat-panel display devices often include an inspection process for detecting any defect such as short-circuiting, pixel defect and display unevenness in the array substrate, prior to the process for mounting the driver IC chips. This inspection process is needed in many case because mounting of the driver IC chips on a defective array substrate not only makes the mounting process in vain but also causes damage on the driver circuits when the driver IC chip is peeled off.

In case of manufacturing active-matrix liquid crystal display devices using thin film transistors (TFTs) as pixel switching elements, the inspection process also reveals disconnection in signal lines and scanning lines and short-circuiting between the signal and scanning lines at their crossing points as well as defects of the TFTs.

For implementing such inspection process, inspection pads for contacting with inspection probe (tester probe) of inspection apparatus have to be disposed respectively to each of signal-input wirings at the periphery portion of the array substrate.

JP-A-1989-296103 (JP-A-11296102, or Japanese patent publication unexamined No.11-296102(1999)) proposes a rectangular array substrate having inspection pads for the signal lines at along the edge opposed to an edge along which signal-line driver IC chips are disposed. The inspection process is facilitated by such construction of the array substrate.

However, sizes of periphery area for external connection become large as much as sizes of an area for disposing the inspection pads. In this way, sizes of non-displaying area (picture-frame area) become large at periphery of the flat-panel display. Size increase of the non-displaying area may be avoided by removing the area for the inspection pads after the inspection process. Even in this case, there arises decrease in number of array substrates obtainable from one gang-printing substrate.

BRIEF SUMMARY OF THE INVENTION

In view of the above drawbacks, the present invention is aimed to provide an array substrate for flat-panel display devices which causes no increase of the picture-frame area due to disposing of inspection pads.

An invention-wise array substrate for flat-panel display devices has on an insulator substrate, an image-displaying area having pixel arrayed in matrix and a periphery connection area for mounting driver IC chips; said image-displaying area comprising a plurality of signal lines arranged in substantially parallel to each other, a plurality of scanning lines crossing the signal lines and arranged in substantially parallel to each other, switching elements disposed in a vicinity of respective crossing points of the signal and scanning lines, each of the switching elements being turned on or turned off by switching drive signals supplied to the scanning lines, and pixel electrodes each forming the pixel and each being supplied with pixel drive signals from the signal line through respective one of the switching elements interposed therebetween; said periphery connection area comprising signal-line pads each being extended from an end of respective one of the signal lines for supplying the pixel drive signals to the respective one of the signal lines from associated one of the driver IC chips when the driver IC chips are mounted, and scanning-line pads each being extended from an end of respective one of the scanning lines for supplying the switching drive signals to the respective one of the scanning lines from associated one of the driver IC chips when the driver IC chips are mounted; each of said signal-line pads also serves as an inspection pad to be contacted with an inspection probe of inspection apparatus.

By this feature, there arises no increase of the picture-frame area while inspection process is facilitated.

DETAILED DESCRIPTION OF THE INVENTION

Figure 1:
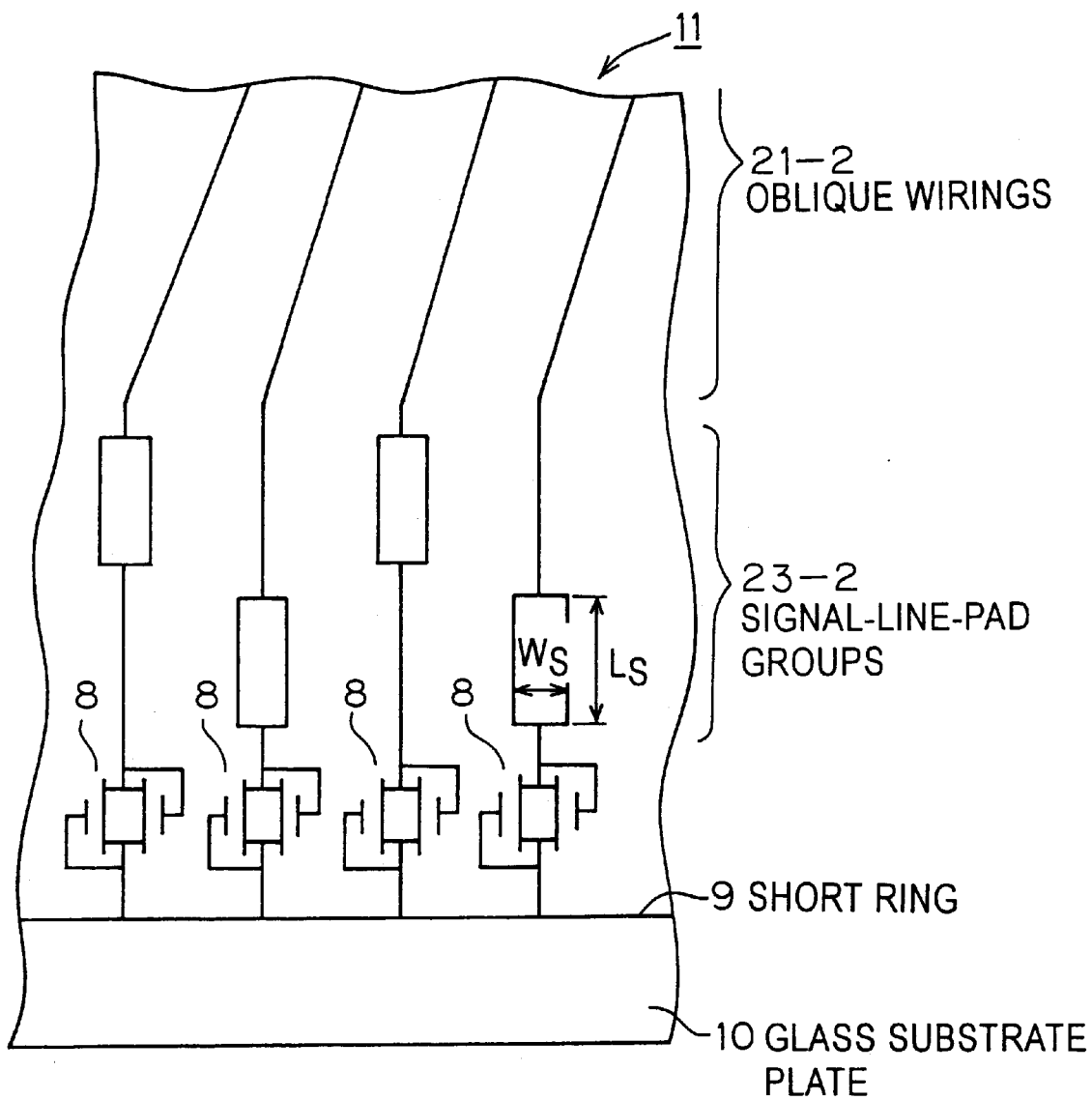
FIG. 1 is a schematic partial plan view showing a signal-line-pads-side periphery on an array substrate for display devices, of the first embodiment.
Figure 2:
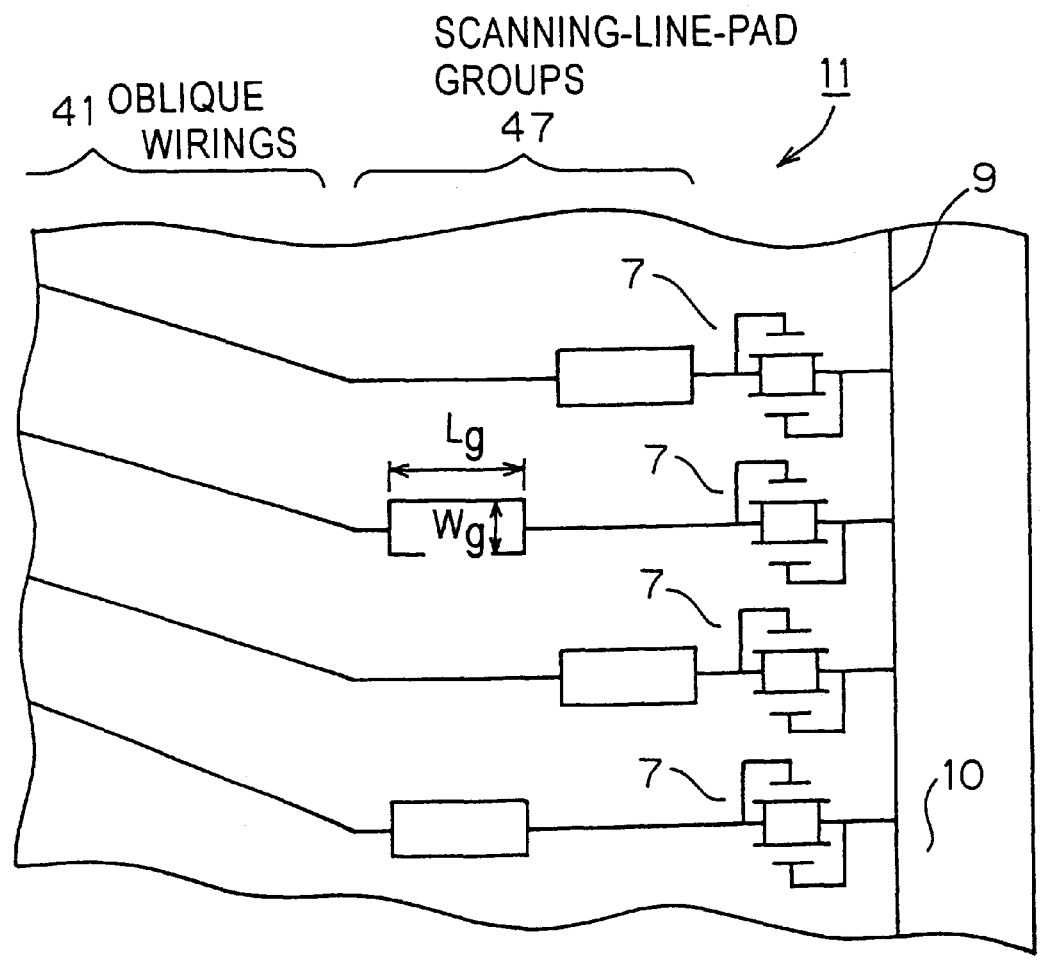
FIG. 2 is a schematic partial plan view showing a scanning-line-pads-side periphery on an array substrate for display devices, of the first embodiment.
Figure 3:
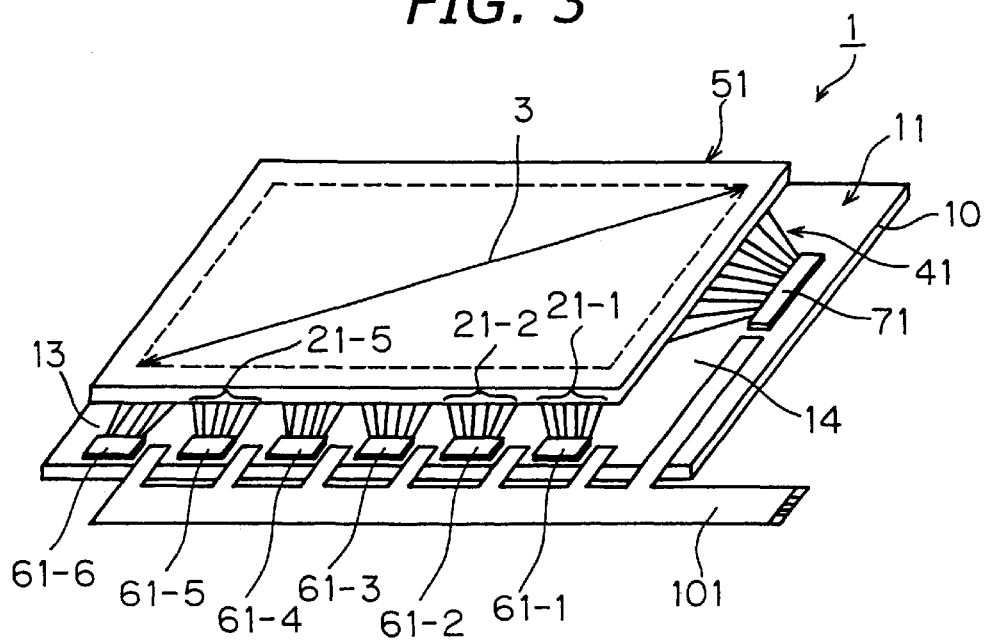
FIG. 3 is a whole perspective view of a flat-panel display.
Figure 4:
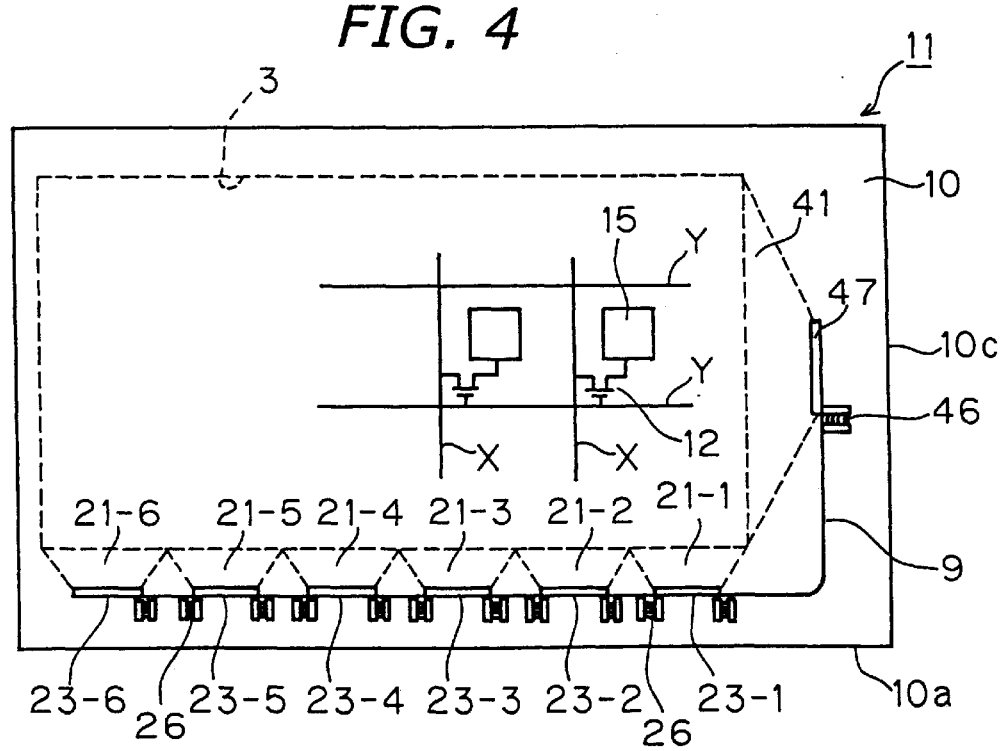
FIG. 4 is a schematic whole plan view of the array substrate before removing a short ring.

The first embodiment of the present invention is explained in conjunction with FIGS. 1 through 4. FIGS. 1 and 2 are schematic partial plan views respectively showing a signal-line-pads-side periphery and a scanning-line-pads-side periphery on an array substrate for display devices, while FIG. 3 is a whole perspective view of a flat-panel display including the array substrate. FIG. 4 is a schematic whole plan view of the array substrate before removing a short ring.

As shown in the FIG. 3, a flat-panel display 1 of the first embodiment is a TN(twisted nematic crystal)-TFT-type transmission liquid crystal display device capable of displaying color image, in which an array substrate 11 is assembled with a counter substrate 51. The flat-panel display 1 has an effective display area 3 of 7-inch diagonal size. Driver circuits are disposed by COG method, on the periphery of the array substrate 11. In detail, edges of the array substrate 11 protrude from associated edges of the counter substrate 15 to form shelf-shaped periphery connection areas 13,14, on which driver IC chips 61-1,61-2 . . . 61-6 and 71 are directly mounted. On the periphery connection areas 13,14, a flexible printing circuit (FPC) 101 is also mounted for inputting drive signals to the driver IC chips 61-1,61-2 . . . 61-6 and 71.

The array substrate 11 has scanning lines Y; signal lines x crossing the scanning lines Y substantially perpendicularly to form a lattice; pixel electrodes 15 each being disposed in each square patch in the lattice; and TFTs 12 each being disposed in a vicinity of respective crossing points of the scanning and signal lines. For example, the scanning lines Y are formed of molybdenum-tungsten (Mo—W) alloy, while the signal lines X are formed of aluminum (Al) alloy. And, the pixel electrodes 15 are formed of transparent conductive material such as ITO(Indium Tin Oxide). Each of the TFTs 12 acts as switching element for an associated pixel electrode 15 connected therewith. These pixel electrodes 15 as a whole form an image display area 3.

The signal lines X are arranged in a pitch of 0.107 mm at the image display area 3 and are extended outward to the periphery connection area 13 along a long-side edge 10a of a rectangular glass substrate plate 10. Extended portions of the signal lines X constitute oblique wiring groups 21-1,21-2 . . . 21-6 each of which extends to respective mounting area for the driver IC chips 61-1,61-2 . . . 61-6. At distal ends of the extended signal lines X, signal-line-input pad groups 23-1,23-2 . . . 23-6 are formed to respectively connect with output bump groups arranged at underneath face of the driver IC chips 61-1,61-2 . . . 61-6, using an ACF or the like as connecting means. Each of the signal-line-input pad groups 23-1,23-2 . . . 23-6 is covered by inner edge portion (portion along an edge facing the image-display area 3) of respective rectangular driver IC chips 61-1,61-2 . . . 61-6, after the driver IC chips are mounted on the periphery connection area 13.

As shown in FIGS. 1 and 3, each input pad of the signal-line-input pad groups 23-1,23-2 . . . 23-6 is connected with a short ring 9, where respective non-linear resistor element 8 is electrically interposed between the each input pad and the short ring 9. In vicinity of and outside of the short ring 9, IC-FPC wirings 26,46 are disposed to electrically connect terminals on underneath faces of branches of FPC 101 with bumps on underneath faces of width-wise edge portions of the driver IC chips 21,71.

As shown in FIG. 1, each pad of the signal-line-input pad groups 23 is arranged in a staggered position with respect to next pads. This means that pads belong to a signal-line-input pad group 23 forms two rows-an inner row and an outer row with respect to the array substrate 11, while no consecutive two pads are located in same one of the inner row and the outer row. A pitch of the pad arrangement in the signal-line-input pad group 23, that is, interval of centerlines of consecutive two pads at a direction along the substrate edge 10a is 45 $\mu$m. Thus, at either of the inner and outer rows, interval of centerlines of consecutive two pads in either row is 90 $\mu$m.

Each pad in the signal-line-input pad group 23 has width Ws and length Ls sufficient to connect with output bumps of the driver IC chips 61 using ACF or the like and sufficient to make enough contact with an inspection probe. Thus, each pad in the signal-line-input pad group 23 serves as an inspection pad before mounting of the driver IC chips 61, while the each pad serves as a connection pad for inputting image signal into a respective signal line X. Width Ws and length Ls of the each pad are, for example, 60 $\mu$m and 110 $\mu$m respectively. The sizes of the pad are preferably more than 30 $\mu$m ×30 $\mu$m to facilitate operation for contacting with the inspection probe.

Input wirings for the scanning lines Y are in an exactly same manner with the input wirings for the signal lines X explained hereto. Nevertheless, brief explanation will be given.

The scanning lines Y are taken out or extended to a periphery connection area 14 along a short-side edge 10c of the array substrate 11. Extended portions of the scanning lines Y constitute an oblique wiring group 41 which extends to amounting area for the driver IC chip 71. At distal ends of the extended scanning lines Y, a scanning-line-input pad group 47 is formed to connect with an output bump group arranged at underneath face of the driver IC chip 71.

As shown in FIGS. 2 and 3, each input pad in the scanning-line-input pad group 47 is connected with the short ring 9 located outside of scanning-line-input pad group 47, until removal of the short ring, through a respective non-linear resistor element 7. The short ring 9 is an L-shaped pattern wiring which run through mounting areas for driver IC chips 71, 61-1,61-2 . . . 61-6.

As shown in FIG. 2, each pad of scanning-line-input pad group 47 is arranged in a staggered position with respect to next pads so that pad of the scanning-line-input pad group 47 forms two rows, in a totally same manner with the signal-line-input pad groups 23. Each pad in the scanning-line-input pad group 47 has width Wg and length Lg sufficient to connect with output bumps of the driver IC chip 71 using ACF or the like and sufficient to make enough contact with an inspection probe, as in the signal-line-pad groups 23. A pitch of the pad arrangement in the scanning-line-input pad group 47 is 45 $\mu$m, while width, Wg and length Lg of the each pad are, for example, 60 $\mu$m and 110 $\mu$m respectively, also as in the signal-line-pad groups 23. Preferable ranges of the width Wg and length Lg are same with those of the pads in the signal-line-pad groups 23.

Above-described embodiment has an advantage in that sizes of picture-frame area or non-displaying peripheral area are able to be reduced, due to the fact that the space for disposing inspection pads separately from the connection pads are no more needed. This is because each connection pads for inputting drive signal to the signal line of the scanning line also serves as an inspection pad. Further, the embodiment enables cost reduction in manufacturing the array substrate, due to simpler formation of wiring pattern on the substrate compared with the prior art.

Moreover, there arises no increase of operational burden for inspection process, because the pads have sufficient sizes for abutting an inspection probe.

Figure 5:
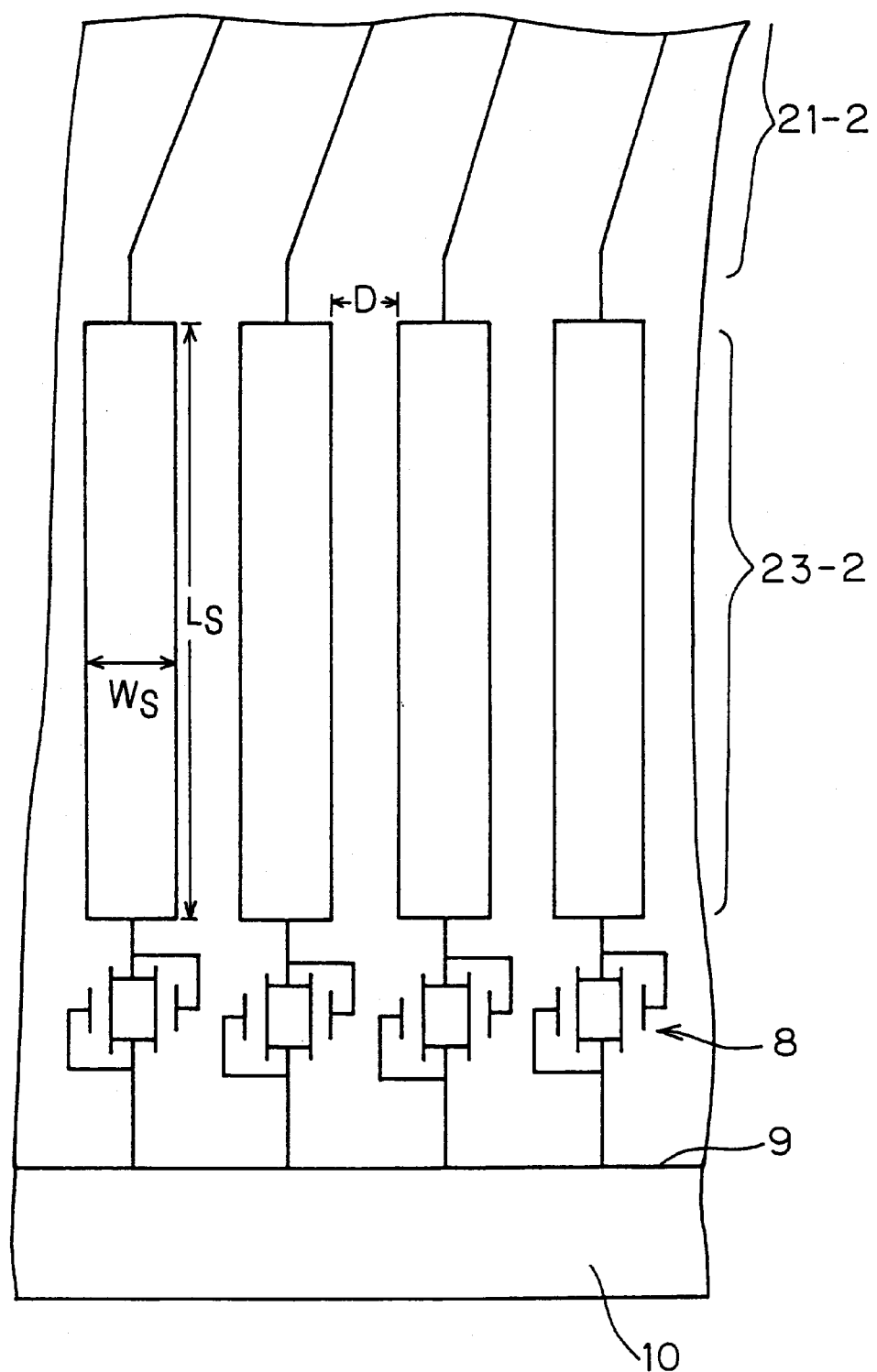
FIG. 5 is a schematic partial plan view showing a signal-line-pads-side periphery on an array substrate for display devices, of the second embodiment.

In hereunder, the second embodiment of the present invention is explained in conjunction with FIG. 5.

As shown in the figure, pads belonging to a signal-line-pad group 23 are arranged in a single row of constant distance from the substrate edge 10a or a verge of the image display area 3. Each of these pads has width Ws of 35 μm and length Ls of 230 μm, while distance D between consecutive pads is 25 μm. Thus, pitch of arranging the pads is 60 μm (0.06 mm). Although not shown in the figure, pads belonging to a scanning-line-pad group 47 are arranged in a single row in same manner. Width Wg and length Lg of each of these pads and pitch of these pads are 35 μm, 230 μm and 60 μm respectively, as same manner as in the signal-line-pad group 23.

Remaining construction of the array substrate of the second embodiment is totally the same with that of the first embodiment.

Pads arrangement and pad sizes of this embodiment are desirable in following occasion-needle fingers of the inspection probe sways little or only limitedly, for example when width of the probe needle finger in a direction along the substrate edge 10a is larger than vertical dimension or thickness of the probe finger. In this occasion, this embodiment enables higher reliability of contact with the inspection probe as well as smaller pitch of arranging pads.

Finally, a modification of this embodiment will be described in which pad length is smaller than the embodiment.

Pads in each of the signal-line pad groups 23 and pads in the scanning-line-pads 47 are arranged to form a line with pitch of 0.06 mm. Width Ws and length Ls of the signal-line pads as well as Width Ws and length Ls of the scanning-line pads are 40 μm and 110 μm respectively.

According to this modification, a width or a size of the area for mounting pad groups 23,47 in a direction perpendicular to the edge 10a of the array substrate 11 is smaller than that of the first and second embodiment, because pads of short length are arranged in a single row. Thus, the widths of the periphery connection areas 13,14 can be further reduced by using narrower driver IC chips.

What is claimed is:

1. An array substrate for flat-panel display devices having on an insulator substrate, an image-displaying area formed of pixels arrayed in matrix, and a periphery connection area for mounting driver IC chips;

said image-displaying area comprising
a plurality of signal lines arranged in substantially parallel to each other,
a plurality of scanning lines crossing the signal lines and arranged in substantially parallel to each other,
switching elements disposed in a vicinity of respective crossing points of the signal and scanning lines, each of the switching elements being turned on or turned off by switching drive signals supplied to the scanning lines, and
pixel electrodes each forming the pixel and each being supplied with pixel drive signals from the signal line through respective one of the switching elements interposed therebetween;

said periphery connection area comprising
signal-line pads each being extended from an end of respective one of the signal lines for supplying the pixel drive signals to the respective one of the signal lines from associated one of the driver IC chips when the driver IC chips are mounted, and
scanning-line pads each being extended from an end of respective one of the scanning lines for supplying the switching drive signals to the respective one of the scanning lines from associated one of the driver IC chips when the driver IC chips are mounted;

each of said signal-line pads also serves as an inspection pad to be contacted with an inspection probe of inspection apparatus.

2. An array substrate for flat-panel display devices according to claim 1, wherein each of the scanning line pads also serves as an inspection pad to be contacted with an inspection probe of inspection apparatus.

3. An array substrate for flat-panel display devices according to claim 1, wherein the signal-line pads are arranged in a plurality of rows differing in distance from verge of the image-displaying area, such that one signal-line pad and next signal-line pad are respectively disposed in one and another one of the rows.

4. An array substrate for flat-panel display devices according to claim 1, wherein the scanning-line pads are arranged in a plurality of rows differing in distance from verge of the image-displaying area, such that one scanning-line pad and next scanning-line pad are respectively disposed in one and another one of the rows.

5. An array substrate for flat-panel display devices according to claim 1, the signal-line pads associated with one of the driver IC chips are arranged in a single row having substantially constant distance from verge of the image-displaying area, while gap between one signal-line pad and next signal-line pad is narrower than anyone of widths of the one and next signal-line pads.

6. An array substrate for flat-panel display devices according to claim 1, the scanning-line pads associated with one of the driver IC chips are arranged in a single row having substantially constant distance from verge of the image-displaying area, while gap between one scanning-line pad and next scanning-line pad is narrower than anyone of widths of the one and next scanning-line pads.

7. An array substrate for flat-panel display devices having on an insulator substrate, an image-displaying area formed of pixels arrayed in matrix, and a periphery connection area for mounting driver IC chips;

said image-displaying area comprising
a plurality of signal lines arranged in substantially parallel to each other,
a plurality of scanning lines crossing the signal lines and arranged in substantially parallel to each other,
switching elements disposed in a vicinity of respective crossing points of the signal and scanning lines, each of the switching elements being turned on or turned off by switching drive signals supplied to the scanning lines, and
pixel electrodes each forming the pixel and each being supplied with pixel drive signals from the signal line through respective one of the switching elements interposed therebetween;

said periphery connection area comprising
signal-line pads arranged in each region for mounting the driver IC chip for supplying the pixel drive signals to the signal line, each of said signal-line pads being electrically connected with respective one of the signal lines through an oblique wiring extended from an end of the respective signal line, and scanning-line pads arranged in each region for mounting the driver IC chip for supplying the switching drive signals to the signal line, each of said scanning-line pads being electrically connected with the respective one of the scanning lines through an oblique wiring extended from an end of the respective scanning line;

each of said signal-line pads also serves as an inspection pad to be contacted with an inspection probe of inspection apparatus.

8. An array substrate for flat-panel display devices according to claim 1 or claim 7, the signal-line pads and the scanning-line pads are electrically connected with a short ring through respective non-linear resistor element electrically interposed between each of the pads and the shorting, until removal of the short ring, on the periphery connection area.

* * * * *